United States Patent [19]

Bryant et al.

[11] 3,979,344

[45] Sept. 7, 1976

[54] VULCANIZABLE SILICON TERMINATED POLYURETHANE POLYMER COMPOSITION HAVING IMPROVED CURE SPEED

[75] Inventors: Earle Ruskin Bryant, Adrian, Mich.; Joseph August Weis, Toledo, Ohio

[73] Assignee: Inmont Corporation, New York, N.Y.

[22] Filed: Nov. 19, 1974

[21] Appl. No.: 525,145

[52] U.S. Cl. .............................. 260/18 TN; 428/425; 428/442
[51] Int. Cl.[2] .......................................... C08G 18/30
[58] Field of Search .............. 260/77.5 A, 77.5 AM, 260/77.5 TB, 18 TN

[56] References Cited
UNITED STATES PATENTS

| | | | |
|---|---|---|---|
| 3,632,557 | 1/1972 | Brode et al. | 260/77.5 TB |
| 3,856,756 | 12/1974 | Wagner et al. | 260/77.5 AM |

*Primary Examiner*—M. J. Welsh
*Attorney, Agent, or Firm*—Philip R. Arvidson

[57] ABSTRACT

Room-temperature-curable silicon-terminated organic sealant compositions having improved cure speeds, and metal and glass primer compositions for use therewith. These sealant compositions comprise a blend of a small amount of N-beta-aminoethyl, gamma - aminopropyl trimethoxy silane with an organosilicon-capped, isocyanate-terminated polyurethane polymer. The composition preferably further comprises a moisture-curing catalyst such as dibutyl tin diacetate.

13 Claims, No Drawings

VULCANIZABLE SILICON TERMINATED POLYURETHANE POLYMER COMPOSITION HAVING IMPROVED CURE SPEED

BACKGROUND OF THE INVENTION

1. Field of the Invention

This invention relates to room-temperature-curable silicon terminated organic sealant compositions having improved cure speeds, and to metal and glass primer compositions for use therewith. This invention also relates to the use of such compositions as fast-curing sealants for vehicles and other uses. These sealants are especially useful for sealing glass to metal, such as to secure the windshield to an automobile body.

2. Description of the Prior Art

The relevent prior art is believed to be fully described in U.S. Pat. No. 3,632,557, the text of which is incorporated herein by reference.

That patent describes vulcanizable silicon-terminated organic polymers whose formula and preparation can be graphically described as follows:

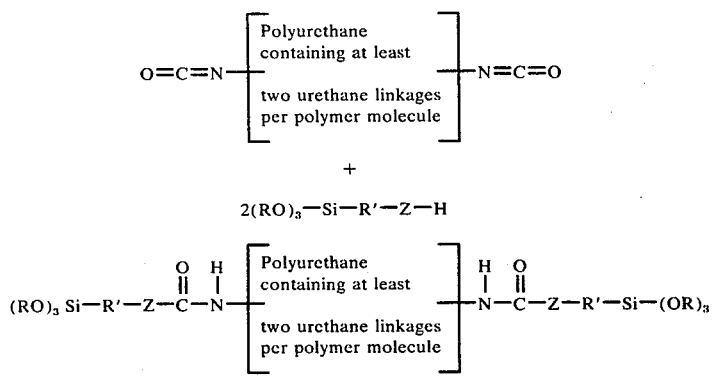

wherein R is a lower alkyl radical of from 1 to 6 carbon atoms; wherein R' is a divalent bridging radical selected from the groups consisting of a divalent hydrocarbon radical, a divalent hydrocarbon ether radical and a divalent hydrocarbon amino radical; and wherein Z is a member selected from the group consisting of -S and -NR'', where R'' is H or a lower alkyl radical of from 1 to 6 carbon atoms.

Applicants have found that these polymers have the disadvantage that they lack the curing speed required in automotive windshield sealant applications.

SUMMARY OF THE INVENTION

Applicants have found that, by blending a small amount of N-beta aminoethyl, gamma aminopropyl trimethoxy silane with the above-described prior art vulcanizable polymers, they obtain a sealant composition having outstanding cure speed. Amounts from about 0.5 to about 2.0%, based on the weight of the polymer, have been found to be particularly effective.

As an example of the cure rate required for automotive windshield sealants, one of the large auto companies requires a cleavage strength of at least 56 pounds/in$^2$ within 6 hours after the sealant is put in place. Use of the compositions disclosed in the above-mentioned U.S. patent have resulted in cure rates of 14 – 30 pounds within 6 hours, typically about 25 pounds. By contrast the sealants of the present invention have demonstrated 56 lbs/in$^2$ cleavage at 3½ hours curing time. The cleavage test used is described in the Appendix.

DESCRIPTION OF THE PREFERRED EMBODIMENT

Applicants have found that particularly good results are obtained when the organosilicon compound used in the formula on page 2 to cap the polymer is gamma aminopropyl trimethoxy silane and also when the amount of silanol curing catalyst used in the sealant composition does not exceed 0.1% based on the polymer weight. The preferred silanol condensation curing catalyst is dibutyltin diacetate. Amounts of N-beta aminoethyl gamma aminopropyl trimethoxy silane from about 0.5 to about 2.0%, based on the weight of the polymer, have been found to be required to meet the particularly demanding specifications of automotive windshield sealants, which are as follows:

| | |
|---|---|
| Curing Speed | at least 56 lbs/in$^2$ cleavage at 6 hours after application |
| Adhesion | excellent adhesion retention after prolonged weathering |
| Odor | no objectionable odor |
| Viscosity (before and after six months aging) | K value in the range of 450–850 |
| Slump | freedom from slump |
| Hardness | Shore "A" Durometer reading of less than 65 |

Description of the various tests for these specifications are set forth in the Appendix.

The manner of preparing a typical sealant composition of this invention is set forth in the following examples.

EXAMPLE 1

A polymer of the type described in U.S. Pat. No. 3,632,557 was prepared as follows:

| | | |
|---|---|---|
| A. | Niax PPG2025 ONE (2000 Molecular Weight Polyether Diol from Union Carbide Corporation) | 2001.00 g |
| | Hylene TM (80:20 Grade Toluene Diisocyanate from DuPont) | 204.00 |
| | Glacial Acetic Acid | 0.55 |
| | Dibutyltin Diacetate | 0.45 |
| B. | Anhydrous Toluene | 110.00 |
| C. | Anhydrous Toluene | 81.00 |
| | Silane A1110 (gamma aminopropyl trimethoxy silane from Union Carbide Corp) | 68.30 |

| | |
|---|---|
| D. Anhydrous Methanol | 273.00 |
| | 2738.30 g |

A was heated to 155°F under anhydrous conditions and maintained at that temperature for 55 minutes, at the end of which time B was added. Over the next 45 minutes the temperature was gradually reduced to 105°F. Heating was continued at about 105°F for the next 2.25 hours, at the end of which time C was added. Over the next 2.25 hours, the temperature was maintained in the range of 150°–165°F, checking for NCO until none was found. The resultant material was refluxed with D for a short time and then allowed to foam to achieve deaeration, and finally cooled.

EXAMPLE 2

A sealant was prepared as follows:

| | Parts by Weight | Percent Based on Polymer Weight |
|---|---|---|
| Polymer of Example 1 | 106.00 | — |
| Carbon black (anhydrous) | 40.00 | 37.74% |
| Thixseal A | 1.55 | 1.46 |
| Dibutyltin diacetate (DBTDA) | 0.10 | 0.09 |
| N-beta aminoethyl, gamma amino-propyl trimethoxy silane (A1120) | 1.00 | 0.94 |
| | 148.65 | |

The polymer of Example 1 and the Thixseal A (a rheology modifier from the Baker Castor Oil Co. comprising a mixture of about 58% castor wax and 42% asbestos) were added to a double planetary mixer and mixed for 3 – 4 minutes. The DBTDA was then added and mixed for 3 – 5 minutes. Then the trimethoxysilane compound was added and mixed for about 5 minutes. Finally the carbon black was added and the resultant mixture was mixed for ¾ – 1 hour at a reduced pressure of 15 inches of mercury. All additions were carried out under anhydrous conditions. The resultant sealant was allowed to cool for 10–15 minutes, still under reduced pressure. The pressure seal was then broken and the sealant was packaged under anhydrous conditions.

The following properties were obtained by testing representative examples of sealants made according to Example 2.

| | |
|---|---|
| Curing Speed | 56 lbs/in² at 3½ hours |
| Adhesion | excellent adhesion after 1500 hrs. Weatherometer at 190 degrees F. |
| Odor | No objectionable odor |
| Viscosity (K value) (aging at 95 degrees F) | fresh 624   aged 30 days 660 aged 6 mos.   718 |
| Slump | No slump |
| Hardness | 63 |

Although the sealant of this invention exhibits sealant and adhesive properties under normal conditions, in order to achieve the outstanding properties set forth above for automotive windshield use it is necessary to employ the glass and metal primers described below.

| Glass Primer | Percent by Weight |
|---|---|
| Chlorinated Rubber | 5 – 35% |
| Carbon Black (furnace type) | 2 – 20 |
| Silane A1120 (See Ex. 2) | 0.1 – 2.0 |

| Glass Primer | Percent by Weight | |
|---|---|---|
| Tinuvin 327 (2-(3',5'-ditert-butyl-2'-hydroxy phenyl)-5 chlorobenzotriazole from Ciba-Geigy) | 0.1 – 2.0 | |
| Conventional anhydrous solvent for chlorinated rubber | 20 – 80 | |
| Conventional plasticizer for chlorinated rubber | 25 – 200% | of amount of chlorinated rubber used |

The chlorinated rubber used in the glass primer should be a 5,000 – 20,000 molecular weight rubber having a 64–65% chlorine content. The chemistry and molecular structure of such rubbers is described in Treatise In Coatings, Vol. 1, Part 1 by Myers and Long (Dekker, 1967). Such rubbers can be obtained from ICI, for example Alloprene X-20, and Hercules (Parlon). Viscosity grades such as 5, 10, 20 or 125 can be used but grade 20 is preferred.

Conventional anhydrous aromatic hydrocarbon solvents for chlorinated rubber can be employed as solvent in the glass primer. The solvent employed must be anhydrous or the silane will be hydrolyzed and ruined.

The plasticizer employed in the glass primer should be selected from the group of polymeric polyester plasticizers which are compatible with chlorinated rubber. That group will be familiar to those skilled in the art. Paraplex G-56, a polymeric polyester plasticizer from Rohm & Haas, is preferred.

The preferred glass primer composition is:

| | Weight Percent Range |
|---|---|
| Alloprene X-20 chlorinated rubber | 15 – 20% |
| Paraplex G-56 plasticizer | 15 – 20 |
| Sterling R carbon black | 4 – 10 |
| Silane A-1120 | 0.5 – 1.0 |
| Tinuvin 327 U.V. screening agent | 1 – 2 |
| Anhydrous toluene | 50 – 60 |
| | 100% |

Metal Primer - for Acrylic Lacquered Steel

The metal primer is broadly the same as the broad glass primer composition, but with the following exceptions:

1. omit the U. V. screening agent,
2. as plasticizer, a conventional monomeric plasticizer for chlorinated rubber, such as diisodecyl phthalate, is preferred. However, the class of polymeric plasticizers described for the glass primer may also be used.

The preferred metal primer composition is:

| | Weight Percent Range |
|---|---|
| Alloprene X-20 chlorinated rubber | 16 – 23% |
| Diisodecyl phthalate plasticizer | 5 – 15 |
| Sterling R carbon black | 2 – 5 |
| Silane A-1120 | 0.5 – 1.0 |
| Anhydrous toluene | 60 – 70 |
| | 100% |

The normal manner of use of the primers and sealant is to brush the glass primer on the perimeter of the windshield, air dry it for a few minutes and then deposit a bead of the sealant on the primed area. The acrylic lacquered body steel is also primed by brushing on the metal primer and allowing it to air dry for a few minutes. The sealant bead on the windshield is then firmly pressed against the body steel.

The adhesive properties of the sealant of this invention applied as described have proved to contribute substantially to the strength (resistance to crushing) of the roof of the automobiles on which they are used.

The effect of various amounts of N-beta aminoethyl, gamma aminopropyl trimethoxy silane (A-1120) on the cure speed and strength of the sealant of Example 2 is shown in the table below.

| Weight Percent A-1120 | Elapsed Time | |
|---|---|---|
| (based on polymer weight) | 3.5 hours | 48 hours |
| 0 | 5 psi cleavage | 200 psi |
| 0.5 | 58 | 291 |
| 1.0 | 60 | 326 |
| 1.7 | 62 | 393 |
| 2.0 | 60 | 390 |

The sealant of this invention may also contain conventional sealant additives such as fillers, reinforcers, rheology modifiers and ultraviolet light screening compounds. The carbon black of the examples of this application, although not necessary to the broad concept of this invention, is necessary to achieve the particular viscosity, slump and hardness properties required for the automotive windshield uses mentioned herein. Similarly, the Thixseal A rheology modifier, although not necessary to the broad invention, is necessary to provide the particularly demanding slump and viscosity properties of windshield sealants. Determination of effective amounts of these materials to achieve the desired properties will be within the skill of those skilled in the art.

It has been found that when the silanol condensation catalyst, such as dibutyl tin diacetate is employed in amounts greater than 0.1%, based on the polymer weight, the adhesive properties of the sealant suffer degradation upon aging.

Use of the closely related material gamma aminopropyl trimethoxy silane (A-1110) in place of A-1120 has resulted in very significantly longer cure times. For example, the time required to reach 56 lbs/in² was 8 hours using A-1110 versus 3¼ hours with A-1120.

When the preferred polymer capping organosilicon (gamma aminopropyl trimethoxy silane) is used in the reaction on page 2,
R is $CH_3$
R' is $C_3H_6$ and
Z is NH.

Although this specification has largely concerned itself with achieving the demanding properties required for automotive windshield sealants, those skilled in the art will appreciate that sealants for less demanding applications can be made outside the ranges specified herein.

APPENDIX

Test Methods

Cure Rate (Cleavage)

A 4 × ¼ inch bead is extruded on one primed, acrylic lacquered plate. Then another plate is placed on top. The plates are pulled in a plane perpendicular to the plane of the bead.

Viscosity

Viscosity is determined by timing the flow of 20 gms. of sealant through a 0.104 inch orifice at 60 psi pressure, and again at 30 psi pressure, and inserting the two values thus obtained into the equation for K value:
$K = P \times t^n$ where $$n = \frac{\log P_1 - \log P_2}{\log t_2 - \log t_1}$$

Slump or Sag Characteristics

A ¼ × ¼ inch cross section sealant bead is applied to a glass plate and allowed to cure in the vertical plane. The sealant should not move downward or "slump" or "sag" but rather should remain in the original position.

Hardness

Hardness of the cured sealant is measured by a Shore "A"-2 Durometer.

We claim:
1. A sealant composition comprising a prepolymer which is a blend of:
   a. a silicon terminated vulcanizable polyurethane polymer of the formula

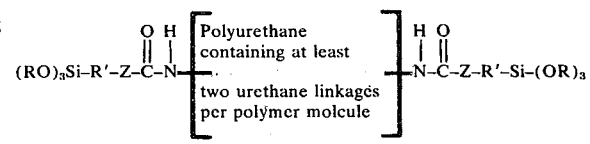

wherein R is a lower alkyl radical of from 1 to 6 carbon atoms; wherein R' is a divalent bridging radical selected from the groups consisting of a divalent hydrocarbon radical, a divalent hydrocarbon ether radical and a divalent hydrocarbon amino radical; and wherein Z is a member selected from the group consisting of —S and —N-R'', where R'' is H or a lower alkyl radical of from 1 to 6 carbon atoms.
   with
   b. a small amount of N-beta aminoethyl, gamma aminopropyl trimethoxy silane.

2. The composition of claim 1 wherein the small amount is between about 0.5 and about 2.0%, based on the polymer weight.

3. The composition of claim 2, wherein the composition additionally comprises a conventional silanol condensation catalyst.

4. The composition of claim 3 wherein said catalyst is present in an amount less than about 0.1% by weight of the polymer.

5. The composition of claim 4 wherein the catalyst is dibutyl tin diacetate.

6. The composition of claim 5 wherein
R is $CH_3$,
R' is $C_3H_6$ and
Z is NH.

7. The composition of claim 6 wherein said composition develops at least 56 lbs/in$^2$ cleavage strength after 6 hours moisture curing and has a viscosity as indicated by a K value of 450 – 850, and wherein said composition additionally comprises effective amounts of anhydrous carbon black and an asbestos/castor wax rheology modifier.

8. The process of preparing a rapidly curing sealant composition comprising mixing:
   a. a silicon terminated vulcanizable polyurethane polymer of the formula

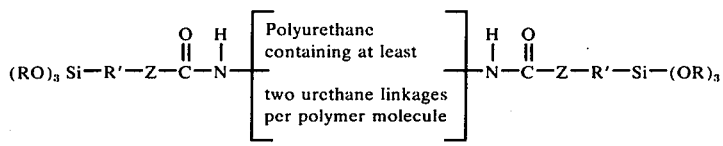

wherein R is a lower alkyl radical of from 1 to 6 carbon atoms; wherein R' is a divalent bridging radical selected from the groups consisting of a divalent hydrocarbon radical, a divalent hydrocarbon ether radical, and a divalent hydrocarbon amino radical; and wherein Z is a member selected from the group consisting of —S and —N-R'', where R'' is H or a lower alkyl radical of from 1 to 6 carbon atoms.

with
   b. a small amount of N-beta aminoethyl, gamma aminopropyl trimethoxy silane.

9. The process of claim 8 wherein the small amount is between about 0.5 and about 2.0%.

10. The process of claim 9, wherein a conventional silanol condensation catalyst is also admixed.

11. The process of claim 10 wherein said catalyst is admixed in an amount less than about 0.1% by weight, based on the weight of the polymer.

12. The process of claim 11 wherein the catalyst is dibutyl tin diacetate.

13. The process of claim 12 wherein
R is $CH_3$,
R' is $C_3H_6$ and
Z is NH.

* * * * *